United States Patent
Ling

(10) Patent No.: US 10,142,001 B2
(45) Date of Patent: *Nov. 27, 2018

(54) METHOD AND SYSTEM FOR HYBRID RADIO FREQUENCY DIGITAL BEAMFORMING

(71) Applicant: Maxlinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,381

(22) Filed: Feb. 20, 2018

(65) Prior Publication Data

US 2018/0175921 A1 Jun. 21, 2018

Related U.S. Application Data

(63) Continuation of application No. 15/165,816, filed on May 26, 2016, now Pat. No. 9,906,285.

(60) Provisional application No. 62/166,308, filed on May 26, 2015.

(51) Int. Cl.
| | |
|---|---|
| *H04K 1/02* | (2006.01) |
| *H04L 25/03* | (2006.01) |
| *H04L 25/49* | (2006.01) |
| *H04B 7/06* | (2006.01) |

(52) U.S. Cl.
CPC .................. *H04B 7/0617* (2013.01)

(58) Field of Classification Search
CPC .......... H04B 3/32; H04B 3/23; H04B 1/1036; H04L 25/03343; H04L 25/497; H04L 25/03057; H04L 25/03038; H04L 27/2647; H04L 2025/03414

USPC .................................. 375/259–285, 295–352
See application file for complete search history.

(56) References Cited

U.S. PATENT DOCUMENTS

| | | | | |
|---|---|---|---|---|
| 5,487,389 | A | * | 1/1996 | Banjanin .................. A61B 8/06 600/455 |
| 5,555,534 | A | * | 9/1996 | Maslak ............... G01S 15/8927 367/135 |
| 5,640,146 | A | * | 6/1997 | Campana, Jr. ..... G08B 21/0222 340/573.4 |
| 5,650,769 | A | * | 7/1997 | Campana, Jr. ..... G08B 21/0222 340/539.1 |

(Continued)

*Primary Examiner* — James M Perez
(74) *Attorney, Agent, or Firm* — McAndrews, Held & Malloy

(57) ABSTRACT

Methods and systems for hybrid radio frequency digital beamforming may include, in an electronic device comprising an antenna array including antennas arranged along first and second directions, beamforming signals in an analog domain along the first direction of the antenna array and in a digital domain along the second direction of the antenna array. The antenna array may include subsets of antennas, where each subset has a system-on-chip (SOC) with analog and digital beamforming circuitry. Signals may be beamformed in the analog domain by amplifying signals received by the antenna array using a configurable gain and shifting the phase of at least one of the amplified signals. The phase-shifted signals may be summed and converted to a digital signal. A frequency-dependent coefficient may be applied to the digital signal. The antenna array may have a fewer number of antennas along the first direction as compared to along the second direction.

20 Claims, 10 Drawing Sheets

(56) References Cited

U.S. PATENT DOCUMENTS

| | | | | |
|---|---|---|---|---|
| 5,656,894 A * | 8/1997 | Murakami | H04N 3/223 | 315/371 |
| 6,023,977 A * | 2/2000 | Langdon | G01N 29/06 | 367/87 |
| 6,359,923 B1 * | 3/2002 | Agee | H04B 1/69 | 370/342 |
| 6,427,531 B1 * | 8/2002 | Chintawongvanich | G01P 5/001 | 73/170.13 |
| 7,453,925 B2 * | 11/2008 | Keegan | G01S 19/22 | 375/148 |
| 7,813,449 B2 * | 10/2010 | Lam | H01Q 3/02 | 343/723 |
| 9,035,828 B2 * | 5/2015 | O'Keeffe | H01Q 1/246 | 342/368 |
| 9,042,276 B1 * | 5/2015 | Harel | H04J 3/1694 | 370/277 |
| 9,258,049 B2 * | 2/2016 | Fujii | H04L 1/06 | |
| 9,270,310 B2 * | 2/2016 | Laurent-Michel | H04B 1/1081 | |
| 9,548,542 B2 * | 1/2017 | Ling | H01Q 15/02 | |
| 9,642,020 B2 * | 5/2017 | Ling | H01Q 3/40 | |
| 9,668,147 B2 * | 5/2017 | Ling | H04W 24/02 | |
| 9,762,302 B1 * | 9/2017 | Shaked | H04B 7/0417 | |
| 9,768,852 B2 * | 9/2017 | Ling | H04B 17/0085 | |
| 9,806,926 B2 * | 10/2017 | Xu | H04B 7/0452 | |
| 9,894,538 B2 * | 2/2018 | Ling | H04W 24/02 | |
| 9,906,285 B2 * | 2/2018 | Ling | H04B 7/0617 | |
| 9,923,585 B2 * | 3/2018 | Laurent-Michel | H04B 1/1081 | |
| 2003/0174090 A1 * | 9/2003 | Spilker, Jr. | G01S 5/0036 | 342/386 |
| 2005/0035894 A1 * | 2/2005 | Dean | H04B 7/0848 | 341/155 |
| 2006/0040624 A1 * | 2/2006 | Lipka | H03F 1/02 | 455/114.3 |
| 2006/0133535 A1 * | 6/2006 | Jung | H01Q 3/267 | 375/296 |
| 2007/0096982 A1 * | 5/2007 | Kalian | H01Q 3/26 | 342/377 |
| 2008/0258981 A1 * | 10/2008 | Achour | H01Q 21/065 | 343/702 |
| 2010/0013527 A1 * | 1/2010 | Warnick | H01Q 3/26 | 327/129 |
| 2011/0199972 A1 * | 8/2011 | Warke | H01Q 3/26 | 370/328 |
| 2012/0106667 A1 * | 5/2012 | Shen | H04B 1/74 | 375/267 |
| 2012/0179043 A1 * | 7/2012 | Kim | G01S 7/52017 | 600/447 |
| 2012/0277590 A1 * | 11/2012 | Song | G01S 7/52019 | 600/443 |
| 2013/0039445 A1 * | 2/2013 | Hwang | H04B 7/0617 | 375/316 |
| 2013/0040682 A1 * | 2/2013 | Chang | H01Q 1/243 | 455/517 |
| 2013/0045690 A1 * | 2/2013 | Seol | H04B 7/0417 | 455/63.4 |
| 2013/0051364 A1 * | 2/2013 | Seol | H04W 16/28 | 370/331 |
| 2013/0083774 A1 * | 4/2013 | Son | H04W 36/0055 | 370/331 |
| 2013/0121342 A1 * | 5/2013 | Kim | H04B 7/0408 | 370/436 |
| 2013/0182683 A1 * | 7/2013 | Seol | H04W 72/04 | 370/335 |
| 2013/0202054 A1 * | 8/2013 | Khan | H01Q 3/26 | 375/259 |
| 2013/0210346 A1 * | 8/2013 | Ling | H04W 4/80 | 455/41.1 |
| 2013/0210352 A1 * | 8/2013 | Ling | H04W 4/80 | 455/41.1 |
| 2014/0146863 A1 * | 5/2014 | Seol | H04B 7/0456 | 375/224 |
| 2014/0197986 A1 * | 7/2014 | Ling | H01Q 3/26 | 342/351 |
| 2014/0327576 A1 * | 11/2014 | Kumar | H04B 7/086 | 342/367 |
| 2014/0329477 A1 * | 11/2014 | Ling | H04B 7/2606 | 455/90.3 |
| 2014/0334566 A1 * | 11/2014 | Kim | H04B 7/0469 | 375/267 |
| 2014/0341310 A1 * | 11/2014 | Rahman | H04B 7/0408 | 375/260 |
| 2014/0347222 A1 * | 11/2014 | Ling | H01Q 3/40 | 342/373 |
| 2015/0103952 A1 * | 4/2015 | Wang | H04L 27/368 | 375/297 |
| 2015/0124688 A1 * | 5/2015 | Xu | H04B 7/0452 | 370/312 |
| 2015/0215853 A1 * | 7/2015 | Ling | H04W 64/003 | 370/254 |
| 2015/0215854 A1 * | 7/2015 | Ling | H04W 24/02 | 455/562.1 |
| 2015/0326285 A1 * | 11/2015 | Zirwas | H04B 7/0452 | 375/267 |
| 2016/0006496 A1 * | 1/2016 | Schneider | H04B 3/54 | 375/267 |
| 2016/0142119 A1 * | 5/2016 | van Houtum | H04B 1/1036 | 375/260 |
| 2016/0164587 A1 * | 6/2016 | Pu | H04W 16/28 | 370/328 |
| 2016/0191020 A1 * | 6/2016 | Velazquez | H03H 21/0067 | 341/118 |
| 2016/0212643 A1 * | 7/2016 | Park | H04B 7/0626 | |
| 2016/0233942 A1 * | 8/2016 | Ling | H04B 7/18517 | |
| 2016/0255605 A1 * | 9/2016 | Kyeong | H04H 20/72 | 370/329 |
| 2016/0352407 A1 * | 12/2016 | Ling | H04B 7/0617 | |
| 2016/0353294 A1 * | 12/2016 | Wang | H04B 7/0456 | |
| 2017/0026938 A1 * | 1/2017 | Onggosanusi | H04B 7/0626 | |
| 2017/0033385 A1 | 2/2017 | Kim | | |
| 2017/0033847 A1 * | 2/2017 | Lomayev | H04B 7/0413 | |
| 2017/0033852 A1 * | 2/2017 | Kim | H04B 7/0456 | |
| 2017/0033853 A1 * | 2/2017 | Kim | H04B 7/0417 | |
| 2017/0078001 A1 * | 3/2017 | Kim | H04B 7/0626 | |
| 2017/0118657 A1 * | 4/2017 | Ling | H01Q 3/40 | |
| 2017/0125913 A1 * | 5/2017 | Ling | H01Q 15/02 | |
| 2017/0134073 A1 * | 5/2017 | Babaei | H04B 7/043 | |
| 2017/0134083 A1 * | 5/2017 | Kim | H04B 7/0456 | |
| 2017/0149144 A1 * | 5/2017 | Gallagher | H01Q 21/245 | |
| 2017/0163326 A1 * | 6/2017 | Kim | H04B 7/06 | |

* cited by examiner

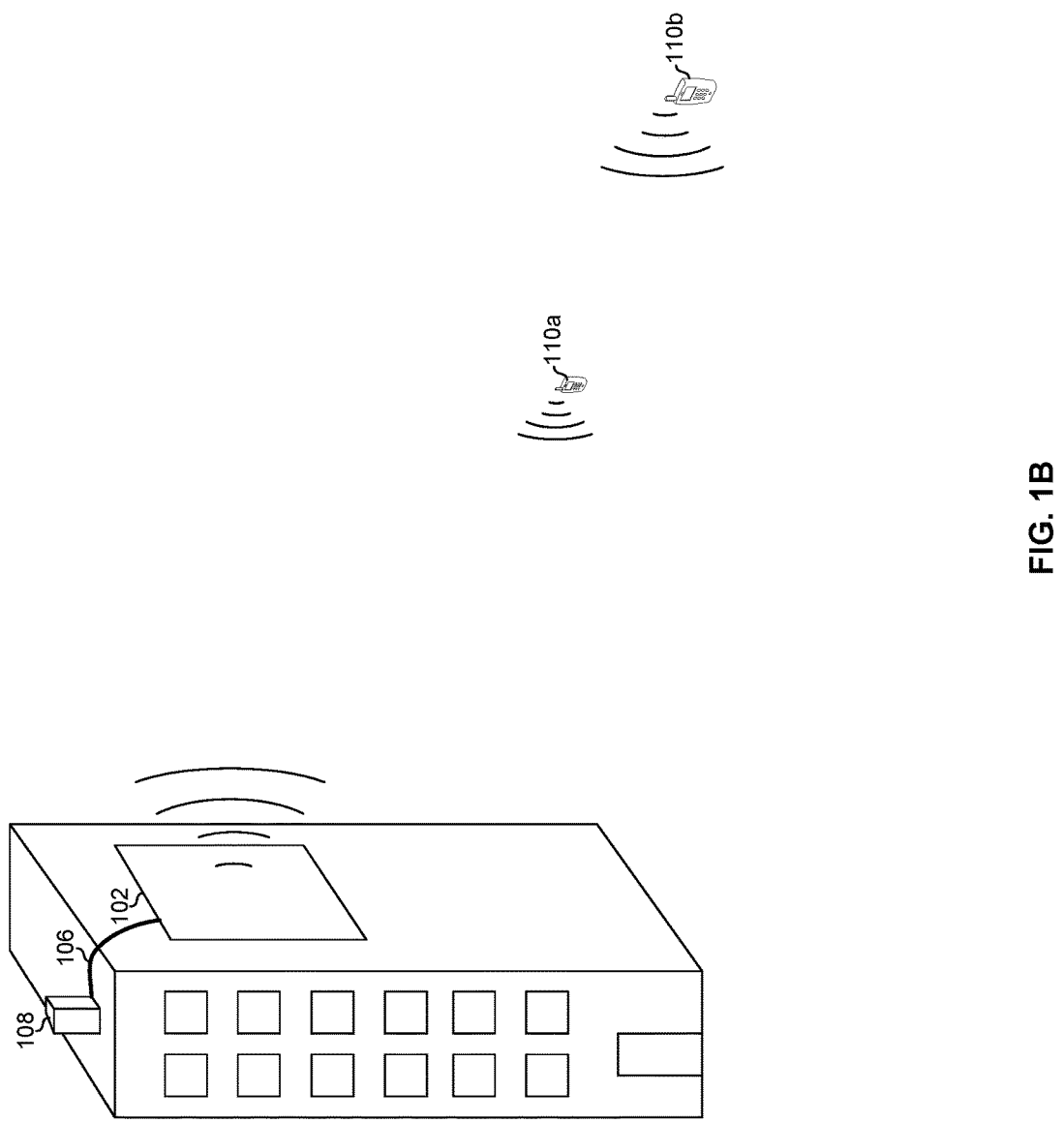

METHOD AND SYSTEM FOR HYBRID RADIO FREQUENCY DIGITAL BEAMFORMING

CROSS-REFERENCE TO RELATED APPLICATIONS/INCORPORATION BY REFERENCE

This application is a continuation of application Ser. No. 15/165,816 filed on May 26, 2016, which makes reference to and claims priority to U.S. Provisional Application Ser. No. 62/166,308 filed on May 26, 2015. The above identified application is hereby incorporated herein by reference in its entirety.

FIELD

Certain embodiments of the invention relate to semiconductor devices. More specifically, certain embodiments of the invention relate to a method and system for hybrid radio frequency digital beamforming.

BACKGROUND

Conventional approaches for beamforming may be costly, cumbersome, and/or inefficient—e.g., they may be complex and/or time consuming, and/or may introduce asymmetry. Further limitations and disadvantages of conventional and traditional approaches will become apparent to one of skill in the art, through comparison of such systems with some aspects of the present disclosure as set forth in the remainder of the present application with reference to the drawings.

Further limitations and disadvantages of conventional and traditional approaches will become apparent to one of skill in the art, through comparison of such systems with the present invention as set forth in the remainder of the present application with reference to the drawings.

BRIEF SUMMARY

A system and/or method for hybrid radio frequency digital beamforming substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1B depicts a large-scale transceiver array of a wireless access network.

DETAILED DESCRIPTION

Certain aspects of the disclosure may be found in hybrid radio frequency (RF) digital beamforming. Exemplary aspects of the invention may comprise, in an electronic device comprising an antenna array comprising antennas arranged along first and second directions, beamforming signals in an analog domain along the first direction of the antenna array and beamforming signals in a digital domain along the second direction of the antenna array. The antenna array may comprise subsets of antennas, where each subset comprises a system-on-chip (SOC) with analog and digital beamforming circuitry. Each SOC may be coupled to other SOCs using a digital interface. Signals may be beamformed in the analog domain by amplifying signals received by the antenna array using a configurable gain and shifting the phase of at least one of the amplified signals. The phase-shifted signals may be summed and converted to a digital signal utilizing an analog-to-digital converter (ADC). A frequency-dependent coefficient may be applied to the digital signal. The antenna array may have a fewer number of antennas along the first direction as compared to a number along the second direction. A tracking module in the electronic device may subtract an amplified and filtered version of a signal received by a first antenna from an amplified and filtered version of a signal received by a second antenna arranged in the first direction from the first antenna.

As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1A:
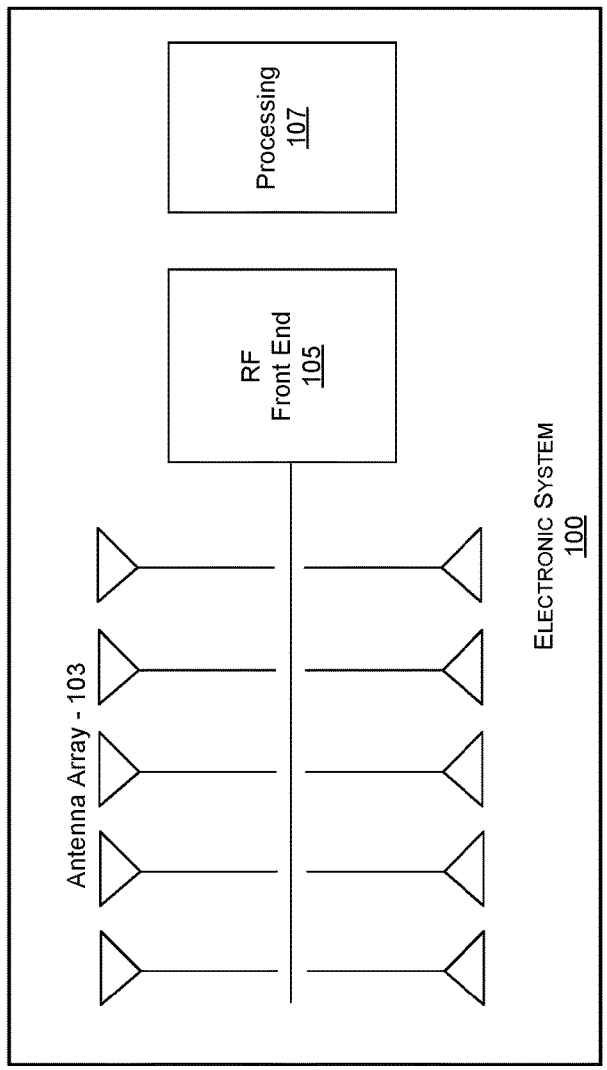
FIG. 1A illustrates an example electronic system that may utilize a beamforming antenna array, in accordance with an example embodiment of the disclosure.

FIG. 1A illustrates an example electronic system that may utilize a beamforming antenna array, in accordance with an example embodiment of the disclosure. Referring to FIG. 1A, there is shown an electronic system 100 with an antenna array 103, a radio frequency (RF) front end 105, and processing module 107.

The antenna array 103 may comprise one or more antenna elements that are operable to receive wireless RF signals for processing by the RF front end 105 and the processing module 107 in the electronic system 100. In another example scenario, the antenna 103 may be operable to transmit wireless RF signals generated by the processing module 107. As the antenna is arranged in an array, beamforming is therefore enabled, with the transmission or reception of signals being directional, due to constructive and destructive interference between signals. To change directionality when transmitting, the phase and amplitude at each antenna element, and when receiving, signals from the different antenna elements may be combined such that an expected pattern of RF signal is preferentially received.

The number of elements in a given direction may indicate the range and resolution. For example, as shown in FIG. 1A, the antenna array 103 may have two rows and five columns of antenna elements, resulting in more beamforming capability in the horizontal direction as compared to the vertical direction. Such an embodiment may be useful in an automotive application, for example, where more horizontal range is needed than vertical.

The RF front end 105 may comprise amplification, mixing, filtering, and analog-to-digital or digital-to-analog conversion functions, for example, and therefore may comprise low-noise amplifiers, programmable gain amplifiers, power amplifiers, low-pass, band-pass, and high-pass filters, analog-to-digital converters (ADCs), and digital-to-analog converters (DACs). Programmable gain amplifiers may be utilized in the beamforming capabilities of the antenna array 103.

The electronic system 100 may comprise suitable circuitry for implementing various aspects of the present disclosure. The electronic system 100 may be configured to support performing, executing or running various operations, functions, applications and/or services. The electronic system 100 may be used, for example, in executing computer programs, playing video and/or audio content, gaming, performing communication applications or services (e.g., Internet access and/or browsing, email, text messaging, chatting and/or voice calling services), providing networking services (e.g., WiFi hotspot, Bluetooth piconet, Ethernet networking, cable or satellite systems, and/or active 4G/3G/femtocell data channels), or the like.

In some instances, the electronic system 100 may enable and/or support communication of data. In this regard, the electronic system 100 may need to communicate with other systems (local or remote), such as during executing, running, and/or performing of operations, functions, applications and/or services supported by the electronic system 100. For example, the electronic system 100 may be configured to support (e.g., using suitable dedicated communication components or subsystems) use of wired and/or wireless connections/interfaces, which may be configured in accordance with one or more supported wireless and/or wired protocols or standards, to facilitate transmission and/or reception of signals (carrying data) to and/or from the electronic system 100. In this regard, the electronic system 100 may be operable to process transmitted and/or received signals in accordance with applicable wired or wireless protocols.

Examples of wireless standards, protocols, and/or interfaces that may be supported and/or used by the electronic system 100 may comprise wireless personal area network (WPAN) protocols, such as Bluetooth (IEEE 802.15); near field communication (NFC) standards; wireless local area network (WLAN) protocols, such as WiFi (IEEE 802.11); cellular standards, such as 2G/2G+(e.g., GSM/GPRS/EDGE, and IS-95 or cdmaOne) and/or 2G/2G+(e.g., CDMA2000, UMTS, and HSPA); 4G standards, such as WiMAX (IEEE 802.16) and LTE; Ultra-Wideband (UWB), and/or the like.

Examples of wired (and in some cases wireless) standards, protocols, and/or interfaces that may be supported and/or used by the electronic system 100 may comprise Ethernet (IEEE 802.3), Fiber Distributed Data Interface (FDDI), Integrated Services Digital Network (ISDN), cable television and/or internet access standards (e.g., ATSC, DVB-C, DOCSIS, etc.), in-home distribution standards such as Multimedia over Coax Alliance (MoCA), and Universal Serial Bus (USB) based interfaces.

Examples of signal processing operations that may be performed by the electronic system 100 comprise, for example, filtering, amplification, analog-to-digital conversion and/or digital-to-analog conversion, up-conversion/down-conversion of baseband signals, encoding/decoding, encryption/decryption, and/or modulation/demodulation.

In some instances, the electronic system 100 may be configured to enable or support input/output operations, such as to allow user interactions that may be needed for controlling the electronic system 100 or operations thereof (e.g., to allow operators to provide input or commands for controlling location specific marketing, or obtain output or feedback pertaining to it). In this regard, the electronic system 100 may comprise components or subsystems for enabling interactions with a user (e.g., end-user or installer), so as to obtain user input and/or to provide user output.

In some instances, the electronic system 100 may enable or support input/output operations, such as to allow providing output to and/or obtaining input from user(s) of the electronic system 100. In this regard, the electronic system 100 may comprise components or subsystems for enabling obtaining user input and/or to provide output to the user. For example, the electronic system 100 may enable or support input/output operations for allowing user interactions which may be needed for controlling the electronic system 100 or operations thereof (e.g., allowing operators to provide input or commands for controlling certain functions or components, to output or provide feedback pertaining, etc.). Also, the electronic system 100 may be operable to support input and/or output of multimedia data. For example, the electronic system 100 may enable or support generating, processing, and/or outputting of video and/or acoustic signals, such as via suitable output devices or components (e.g., displays, loudspeakers, etc.). In this regard, the output signals may be generated based on content, which may be in digital form (e.g., digitally formatted music or the like). Similarly, the electronic system 100 may enable or support capturing and processing of video and/or acoustic signals, such as via suitable input devices or components (e.g., cameras, microphones, etc.), to generate (e.g., to store or communicate) corresponding data. The corresponding data may be in digital form (e.g., digitally formatted music, video, or the like).

The electronic system 100 may be a stationary system (i.e. being installed at, and/or configured for use only in particular location). In other instances, however, the electronic system 100 may be a mobile device—i.e. intended for use on the move and/or at different locations. In this regard, the electronic system 100 may be designed and/or configured (e.g., as handheld device) to allow for ease of movement, such as to allow it to be readily moved while being held by the user as the user moves, and the electronic system 100 may be configured to perform at least some of the operations, functions, applications and/or services supported on the move.

Examples of electronic systems may comprise handheld electronic devices (e.g., cellular phones, smartphones, or tablets), computers (e.g., laptops, desktops, or servers), dedicated media devices (e.g., televisions, game consoles, or portable media players, etc.), set-top boxes (STBs) or other similar receiver systems, and the like. The disclosure, however, is not limited to any particular type of electronic system.

In operation, the electronic system 100 may be operable to perform various operations, functions, applications and/or services. For example, in some instances, electronic system 100 may be operable to transmit and/or receive RF signals via the antenna array 103, which may be operable to provide beamforming of signals transmitted and/or received from the electronic system 100. The antenna array 103 may have more elements along one axis as compared to a perpendicular axis. In this example scenario, digital beamforming may be utilized along the first axis with a larger number of elements while simpler analog beamforming may be utilized along the perpendicular axis with fewer elements.

FIG. 1B depicts a large-scale transceiver array of a wireless access network. The array 102 is mounted on a building and connected to a baseband unit 108 via one or more cables 106 (e.g., fiber optic cables, coaxial cables, or any other suitable type of cable). The array 102 communicates with mobile subscribers 110a and 110b.

In an example scenario, the array 102 may be operable to beamform transmitted and received signals and may utilize hybrid RF digital beamforming where analog steering is utilized along one axis and digital beamforming is utilized along another axis. Such a beamforming configuration may be utilized where less steering is needed along one axis (e.g., horizontal) and more steering is needed along a second axis (e.g., vertical) in which case analog steering may be utilized horizontally and digital for vertical steering. This is in contrast to automotive beamforming, where little vertical steering is needed and more horizontal steering is needed.

Figure 2A:
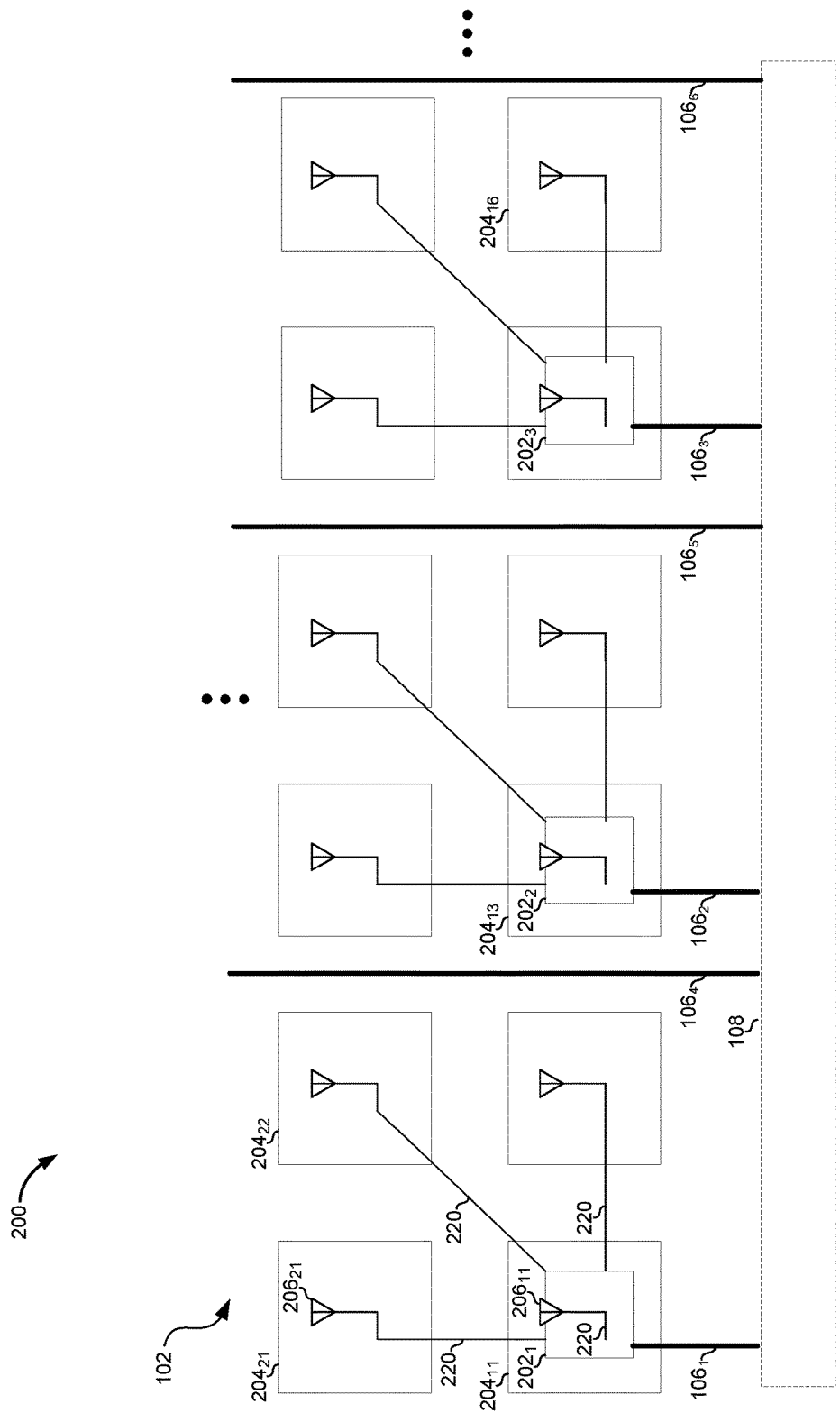
FIG. 2A depicts components of an example implementation of the large-scale transceiver array of FIG. 1.

FIG. 2A depicts components of an example implementation of the large-scale transceiver array of FIG. 1. The example array 102 in FIG. 2A comprises a plurality of modules 204 (any particular module 204 is called out as $204_{RC}$, where R and C are the module's row and column indexes, respectively) and baseband module 108 coupled via cables 106. Although twelve modules are shown for illustration, an array 102 may comprise any number of modules (e.g., 32, 64, 128, or any other number).

The modules 204 may, for example, be installed in a manner similar to installing tiles. They may be laid out in a regular pattern and adhered to the wall using any suitable fastener such as glue, screws, etc.

Each of the modules 204 comprises an antenna element 206 (any particular antenna element 206 is called out as $206_{rc}$, where $1 \le r \le R$, $1 \le c \le C$, and C is the total number of rows in the array, and C is the total number of columns in the array). A subset of the modules 204 (e.g., every Nth module, where N=4 in the example shown) comprise transceiver circuits 202 (any particular transceiver circuit 202 is called out as $202_x$, where $1 \le x \le X$ and X is the total number of transceivers in the array 102 (e.g., X=(R*C)/4 in the example of FIG. 2A).

Each of the transceiver circuits 202 transmits and receives via a respective subset of the antenna elements 206. In FIG. 2A, each transceiver circuit 202 is shown connected to its respective antenna elements 206 via links 220, which may be wired, optical fiber, and/or wireless links. In an example implementation, such wireless links may use broadband near-field communication (BNC) links as, for example, described in U.S. Patent Application Publication 20130210352 titled "Method And System For Broadband Near-Field Communication Utilizing Full Spectrum Capture (FSC) Supporting Ranging," which is hereby incorporated herein by reference.

In an example scenario, the transceiver circuits 202 may provide beamforming capability along two axes with digital beamforming along one and analog beamforming along the other. For example, the two rows of antennas may provide a large degree of steering along the horizontal direction with digital beamforming and less beamforming in the vertical direction with analog beamforming.

In the example implementation of FIG. 2A, each of the transceivers is connected to the baseband unit 108 via a respective cable 106. Such an architecture may reduce the amount of data that each cable is required to carry but may also introduce a lot of complexity and cost. Accordingly, an alternative is shown in FIG. 2B in which only a subset of the transceivers 202 connect to the baseband unit and the remaining transceivers are connected in a daisy chain fashion via links 252.

Figure 2B:
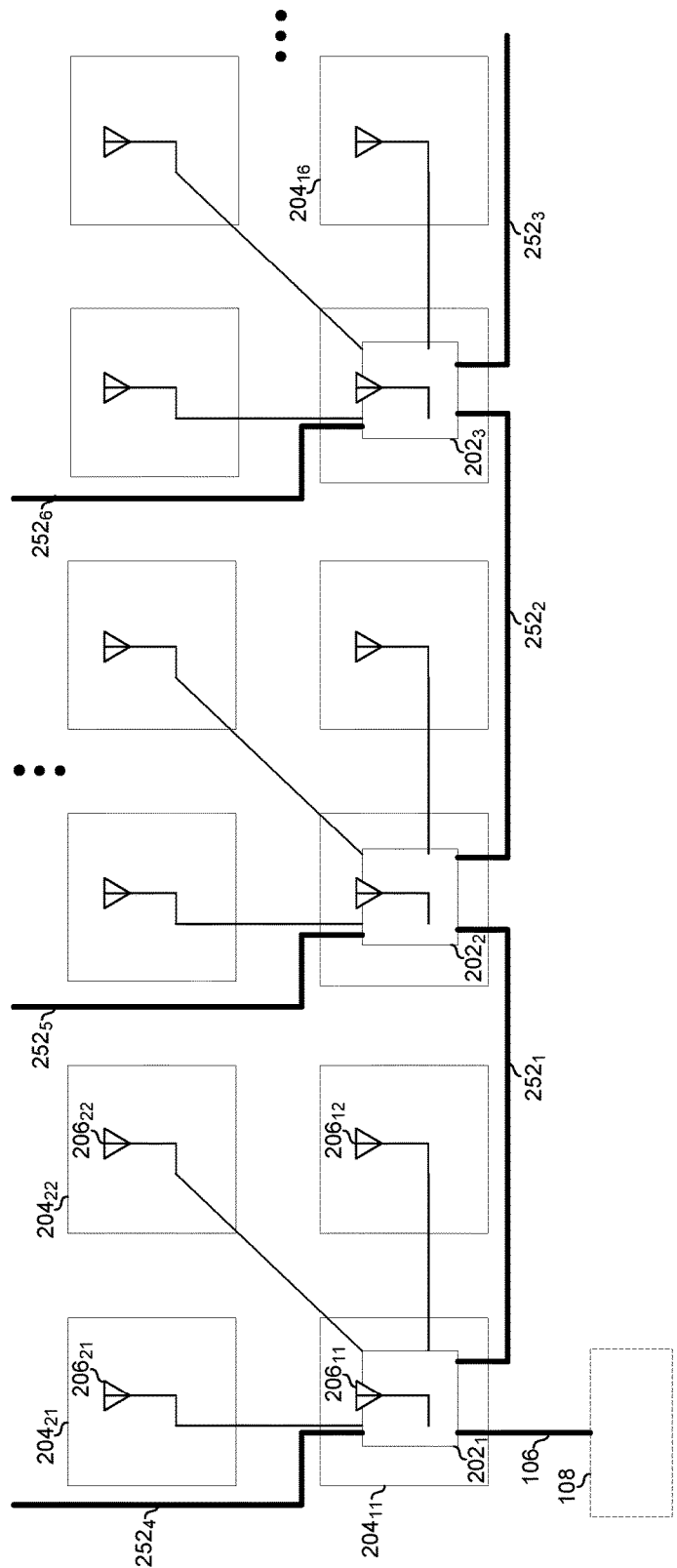
FIG. 2B depicts components of another example implementation of the large-scale transceiver array of FIG. 1.

FIG. 2B depicts components of another example implementation of the large-scale transceiver array of FIG. 1. The example array 102 in FIG. 2B comprises a plurality of modules 204 (any particular module 204 is called out as $204_{RC}$, where R and C are the module's row and column indexes, respectively) and baseband module 108 coupled to the first module $204_{11}$ via cable 106. Although twelve modules are shown for illustration, an array 102 may comprise any number of modules (e.g., 32, 64, 128, or any other number). In this embodiment only a single cable 106 is coupled to the first module and signals are then connected in a daisy chain fashion via links 252.

Figure 3:
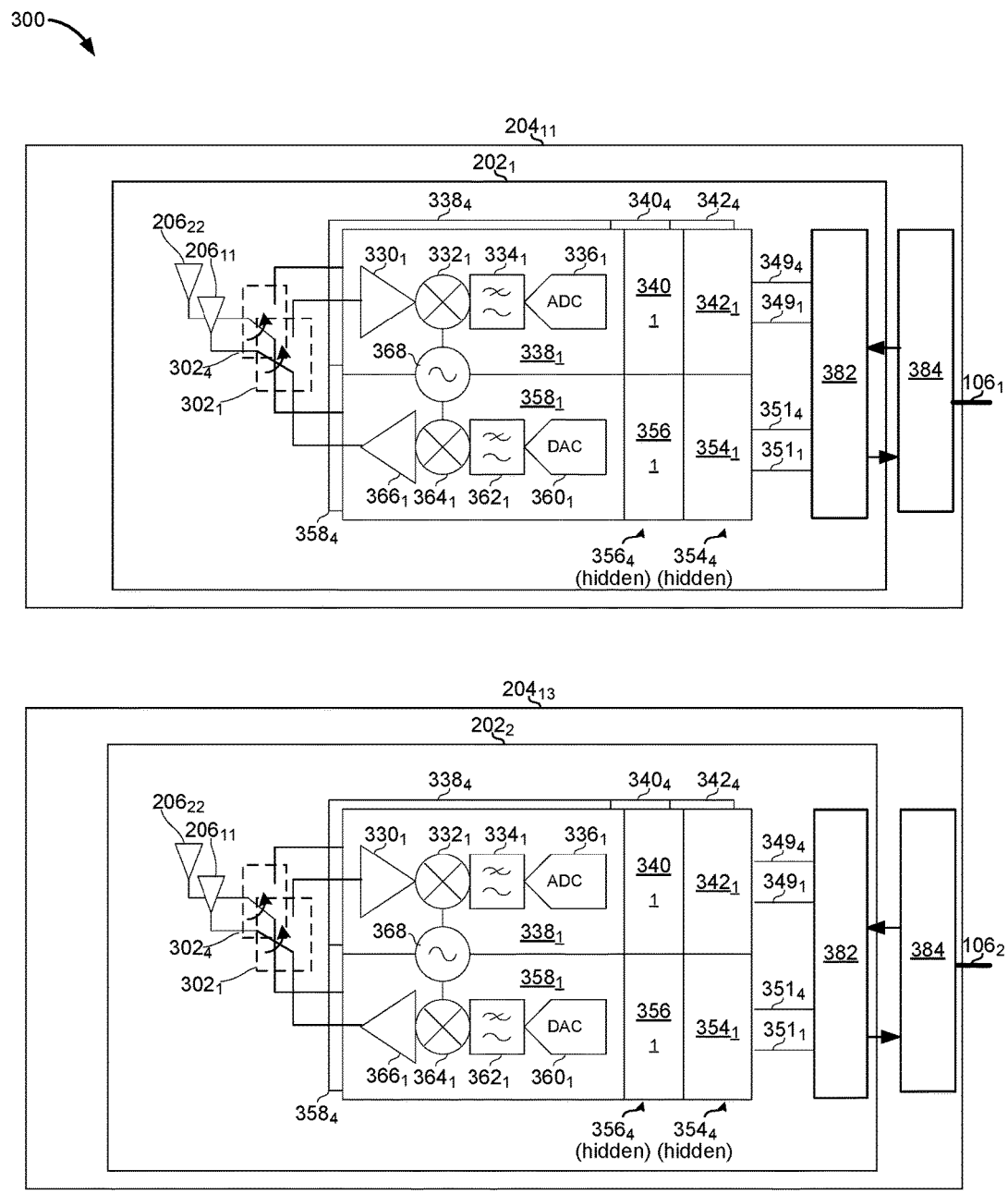
FIG. 3 depicts an example implementation of the transceiver-array modules of FIG. 2A.

FIG. 3 depicts an example implementation of the transceiver-array modules of FIGS. 2A and 2B. For clarity of illustration, only two of the modules, $204_{11}$ and $204_{13}$ are shown. In the example implementation shown, each of the example modules 204 comprises four antennas 206, a transceiver circuit 202, and a circuit assembly 384. The circuit 202 may be a single integrated circuit die (e.g., CMOS). The circuit assembly 384 may comprise components which are undesirable to integrate on chip with the circuit 202. For example, for an implementation in which the links 106 are fiber optic cables, the circuit assembly 384 may comprise a laser diode and laser detector mounted on a PCB. In an example scenario, four antennas may be coupled to each circuit 202 as shown further with respect to FIG. 4.

In the example implementation shown, each of the transceiver circuits 202 comprises transmit/receive switches $302_1$-$302_4$, receive analog front-end circuits $338_1$-$338_4$, receive digital signal processing circuits $340_1$-$340_4$, demodulator/decoder circuits $342_1$-$342_4$, interface 382, encoder/modulator circuits $354_1$-$354_4$, transmit digital signal processing circuits $356_1$-$356_4$, and transmit analog front-end circuits $358_1$-$358_4$.

Each of the transmit/receive switches 302 is configurable between a transmit configuration in which a respective transmit analog front-end 358 is connected to a respective antenna element 206 and a receive configuration in which a respective receive analog front-end 338 is connected to a respective antenna element 206. In practice, the switches 302 cannot provide perfect isolation. Consequently, even when a switch 302 is configured for transmit, some signal will leak through to the receive front end.

Each receiver analog front-end 338 comprises an amplifier 330, a mixer 332, a filter 334, and an analog-to-digital converter 336. Each transmit analog front-end 358 comprises a digital to analog converter 360, a filter 362, a mixer 364, and a power amplifier 366.

Each receive digital signal processing circuit $340_1$-$340_4$ may be operable to, for example, perform filtering, calibration (e.g., calibration of in-phase and quadrature phase signal paths), and/or the like. In addition the receive digital signal processing circuits $340_1$-$340_4$ may be operable to beamform and may utilize analog beamforming along an axis requiring less steering and digital beamforming along an axis requiring more steering. In an example scenario, two rows of antennas with multiple antennas along one axis, e.g., 2×8, may provide more steering along the 8-antenna axis utilizing digital beamforming and less steering along the 2 rows utilizing analog beamforming.

Similarly, digital and analog beamforming may be utilized for transmission of signals. Accordingly, each of the transmit digital signal processing circuits 356 may be operable to, for example, perform beamforming with higher steering while analog beamforming may be utilized for an axis with less beam steering requirements Each demodulator/decoder 342 may be operable to demodulate received signals in accordance with modulation schemes used for the access network in which array 102 participates, and decode received signals in accordance with FEC algorithms schemes used for the access network in which array 102 participates.

Each encoder/modulator 354 may be operable to modulate signals to be transmitted in accordance with modulation schemes used for the access network in which array 102 participates, and encode signals to be transmitted in accordance with FEC algorithms schemes used for the access network in which array 102 participates.

The interface circuit 382 may be operable to transmit and receive in accordance with protocols in use on the link 106. In an example implementation where the link 106 is a fiber optic cable, the interface 382 may be operable to demodulate the signal received from the laser detector and modulate a signal for output to the laser diode.

In another example implementation, some of the circuitry shown in circuits 202 may instead be implemented in the baseband unit 108. For example, modulation, demodulation, FEC encoding, and FEC decoding may be done in the baseband unit 108. This may reduce the amount of data that needs to be delivered over links 106 but at the expense of increased complexity in the circuit 202. As another example, the relatively-less memory/processor intensive demodulation may be performed in the circuit 202 to output log likelihood ratios (LLRs) to the baseband unit 108 where the relatively-more memory/processor intensive decoding may take place.

Figure 4:
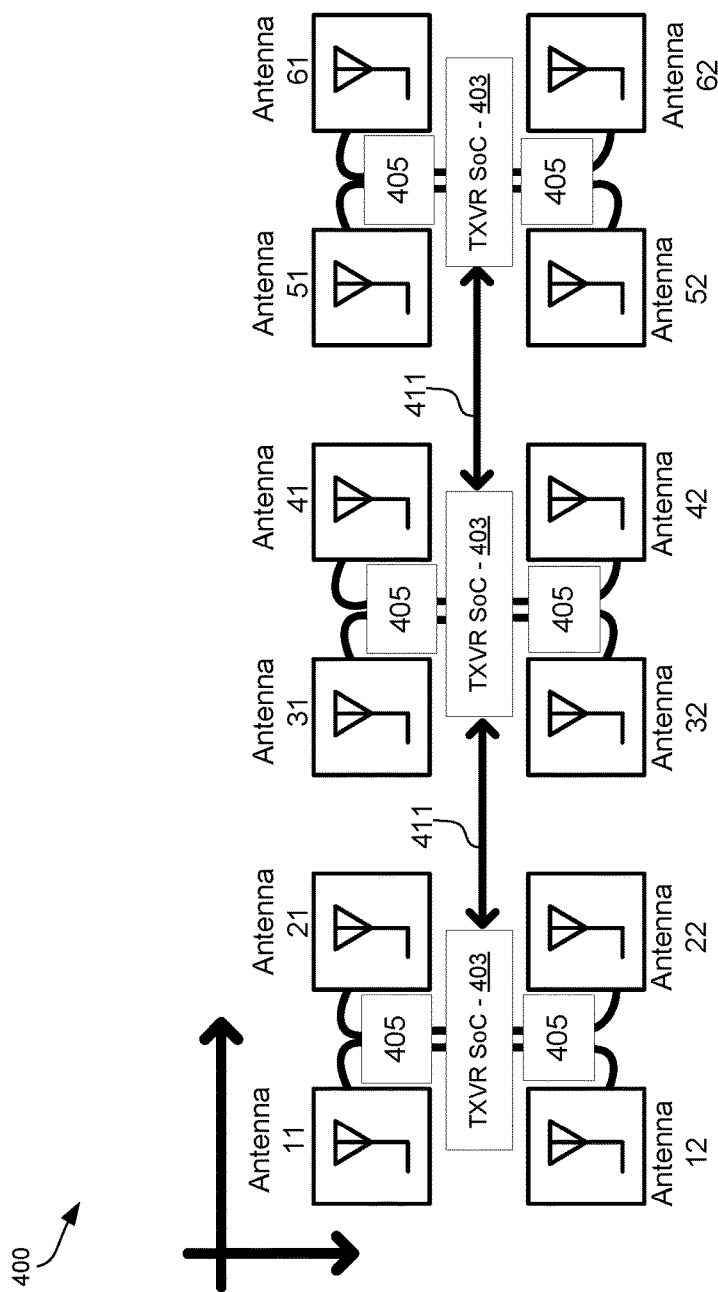
FIG. 4 illustrates hybrid RF digital beamforming, in accordance with an example embodiment of the disclosure.

FIG. 4 illustrates hybrid RF digital beamforming, in accordance with an example embodiment of the disclosure. Referring to FIG. 4, there is shown an array of antennas, labeled XY for column X and row Y, a transceiver chip 403 for each set of 4 antennas, and PA/LNA/Switch circuitry 405 for each pair of antennas. Applications for such an array may comprise satellite receivers with phased-array feeds, automotive radar, and millimeter wavelength backhaul, for example.

In an example scenario, the transceiver chips 403 may be operable to provide hybrid beamforming for the antenna array 400 where analog beamforming is utilized along one axis, e.g., vertical in this case, and digital beamforming may be utilized along another axis, e.g., horizontal axis along the rows of antennas in FIG. 4. Digital beamforming may be utilized in the horizontal axis along the rows of antennas resulting in more steering as compared to the vertical direction with analog beamforming. A high-speed digital interface 411 may couple each of the transceivers 403 enabling digital beamforming along the horizontal axis.

The PA/LNA/Switch circuitry 405 shown for each pair of antennas may comprise RF front end circuitry for transmitting and receiving RF signals including one or more transmit/receive switches enabling both transmission and reception of signals via the antennas. Accordingly, the PA/LNA/ Switch circuitry 405 may comprise amplification, mixing, filtering, and analog-to-digital or digital-to-analog conversion functions, for example, and therefore may comprise low-noise amplifiers, programmable gain amplifiers, power amplifiers, low-pass, band-pass, and high-pass filters, analog-to-digital converters (ADCs), and digital-to-analog converters (DACs). Programmable gain amplifiers may be utilized in the beamforming capabilities of the antenna array 400.

Figure 5A:
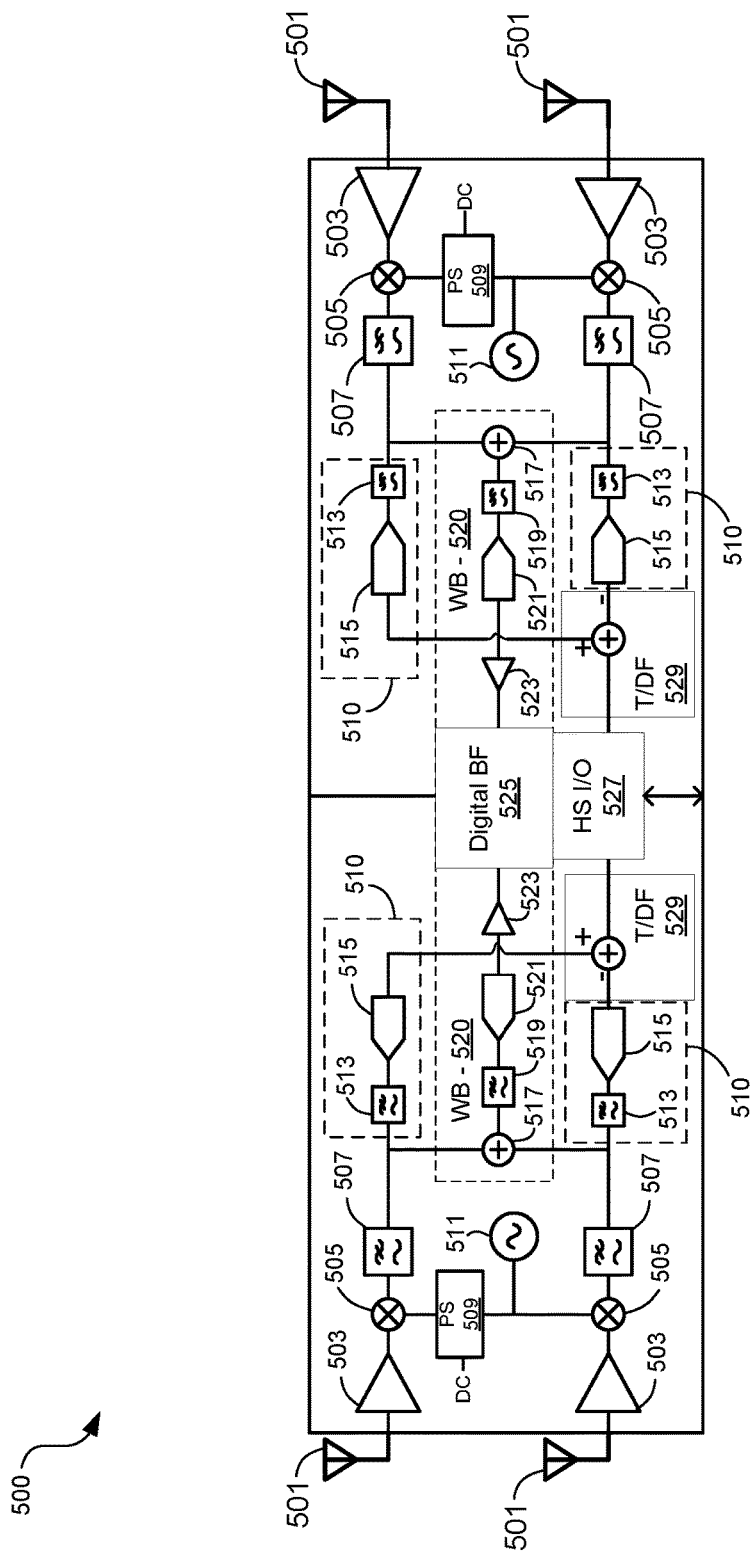
FIG. 5A illustrates example beamforming receiver circuitry in accordance with an example embodiment of the disclosure.

FIG. 5A illustrates example beamforming receiver circuitry in accordance with an example embodiment of the disclosure. Referring to FIG. 5A, there is shown a receiver circuit 500 with digital and analog beamforming capability. Four antennae 501 are coupled to the receiver circuit 500 where each path may comprise a separate in-phase and quadrature (I and Q) path, as illustrated by the expanded path shown in FIG. 6, comprising I and Q paths. Each path may comprise an LNA 503, an I/O mixer 505, low-pass filters 507 and 513, an analog-to-digital converter (ADC) 515, and a VCO/PLL 511 with phase shifter module 509 for each pair of I/O paths. Digital and analog beamforming circuitry may receive the I and Q signals. The LNAs 503 may comprise a configurable gain and the phase shifter 509 enables a configurable phase difference between signals output by the mixers 505.

The receiver circuit 500 may comprise wideband signal paths 520 and narrowband signal paths 510, where the narrowband paths 510 may be utilized for tracking and direction finding (T/DF) using the T/DF summer 529, and the wideband paths 520 may be utilized for beamforming and may comprise an adder 517, low-pass filter 519, and an ADC 521 for receiving and digitizing the filtered and down-converted signals from each I/O path. The resulting digital signal may be amplified by a complex frequency-dependent weight, or coefficient, 523 before being communicating to digital beamforming circuitry 525.

Analog beamforming may be enabled by the amplitude and phase adjustments of the received signals by the LNAs 503 and phase shifter 509, and then combining them in the analog domain by the summers 517, which each sum the two analog signals from a pair of antennas 501. The constructive/ destructive interference of various received signals then results in beamforming by each vertical pair of antennas.

Digital beamforming may be carried out by the digital beamforming circuitry 525, which receives digital signals that have been weighted by the complex frequency-dependent weight 523 from each pair of antennas 501 as well as from other antenna pairs in the array. In this manner, higher complexity processing may be performed in the digital domain by the digital beamforming circuitry 525 for more complex and/or wider range beamforming, while lower complexity, or narrower range, beamforming may be performed in the analog domain before digitizing.

A high-speed digital I/O 527 may communicate beamforming data between transceiver circuits, thereby enabling higher steering along desired axes, horizontal in this example. Accordingly, the digital beamforming circuit 525 in a plurality of transceiver circuits may enable beamforming from a plurality of antennae and analog beamforming may be utilized for each pair in the vertical direction.

Figure 5B:
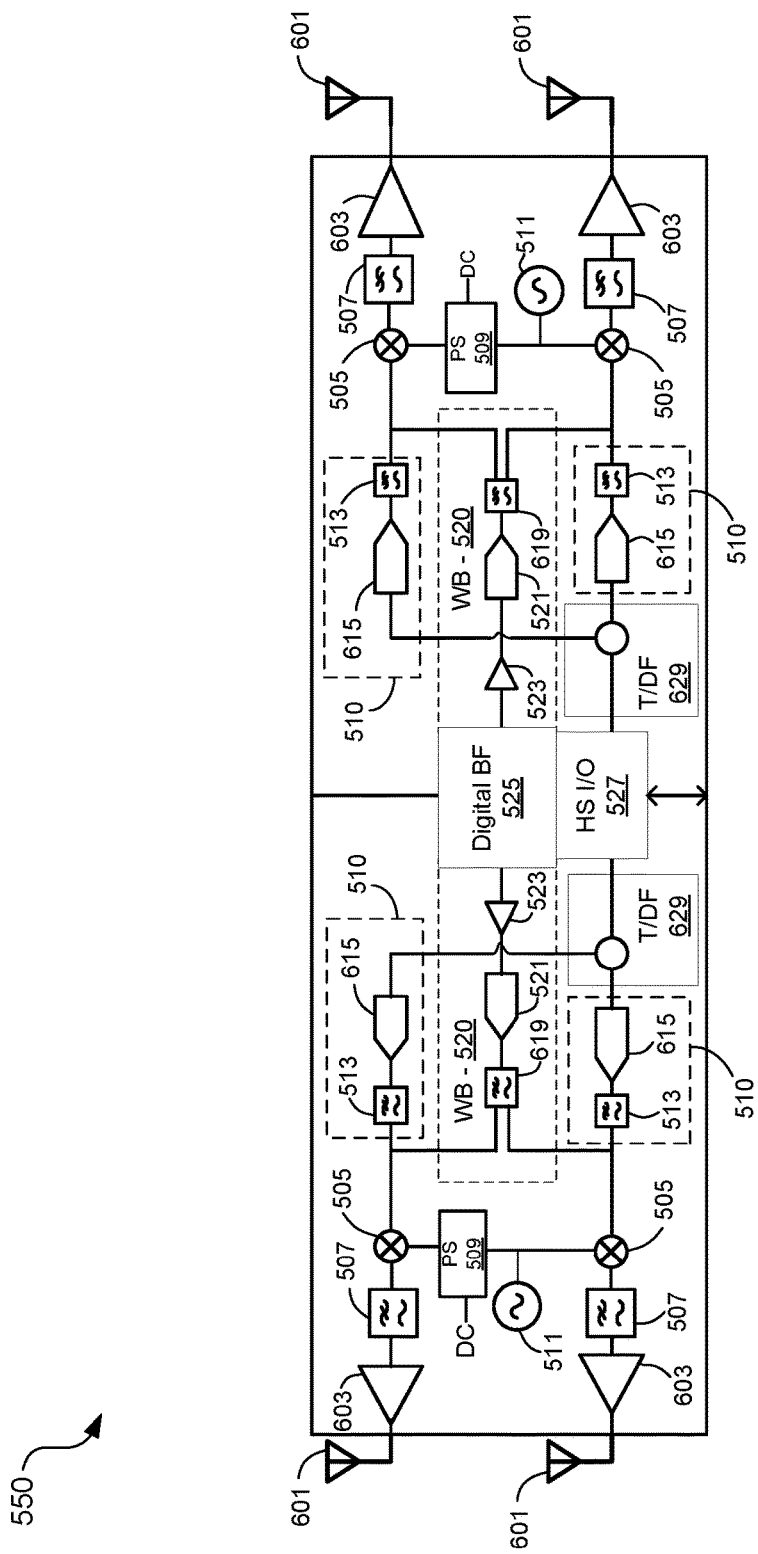
FIG. 5B illustrates transmitter circuitry with hybrid RF digital beamforming, in accordance with an example embodiment of the disclosure.

FIG. 5B illustrates transmitter circuitry with hybrid RF digital beamforming, in accordance with an example embodiment of the disclosure. Referring to FIG. 5B, there is shown a transmitter 550 with example RF transmit circuitry, similar to the receiver circuitry of FIG. 5A, but in reverse direction for transmission. As with FIG. 5A, the transmitter 550 comprises narrowband and wideband signal paths 510 and 520, respectively, and may provide analog beamforming along one axis, e.g., vertical, and digital beamforming in another axis, e.g., horizontal. In an example scenario, a transmit/receive switch may enable switching between transmission and reception of the circuits 500 and 550 with RF hybrid beamforming, as illustrated by T/R switches 302 in FIG. 3.

In operation, signals for transmission may be communicated to each transmitter 550, where the signals may enable beamforming in the digital domain, via the digital beamforming circuitry 525, as well as analog beamforming. The components of the transmitter module 550 may be substantially similar to the receiver of FIG. 5A, but with some differences, such as the T/DF 629 comprising a splitting operation instead of summing, and the filters 619 generating two outputs to enable the digitally beamformed transmission signal. In addition, the power amplifiers 603 may amplify the signals for transmission with variable gain levels, which along with the phase control of the phase shifter 509, enables analog beamforming.

Figure 6:
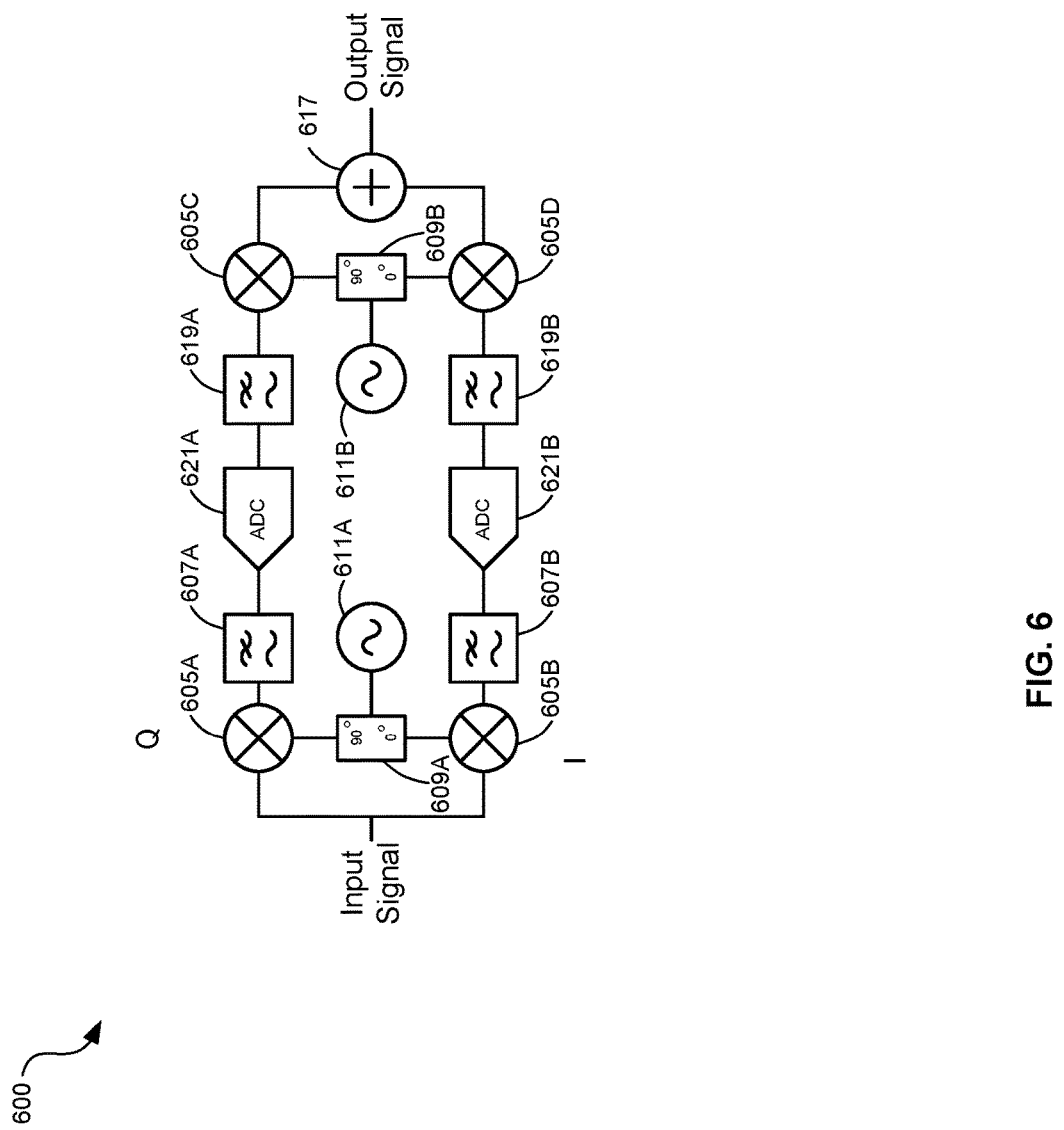
FIG. 6 is an expanded view of a signal path comprising in-phase and quadrature paths, in accordance with an example embodiment of the disclosure.

FIG. 6 is an expanded view of a signal path comprising in-phase and quadrature paths, in accordance with an example embodiment of the disclosure. Referring to FIG. 6, there is shown I and Q transceiver path 600 comprising mixers 605A-605D, low pass filters 607A and 607B, VCO/PLLs 611A and 611B, phase shifters 609A and 609B, summer 617, ADCs 621A and 621B, and digital channel select filters 619A and 619B.

The I and Q transceiver path 600 may be operable to extract I and Q signals from an input signal by down-converting the input signal with two mixers 605A and 605B with clock signals 90 degrees out of phase. The I and Q signals may then be processed with filters 607A and 607B, converted to digital signals using the ADCs 621A and 621B, and then desired digital channels may be selected by the digital selection filters 619A and 619B. In an example scenario, the resulting signals may be recombined using the summer 617.

Figure 7:
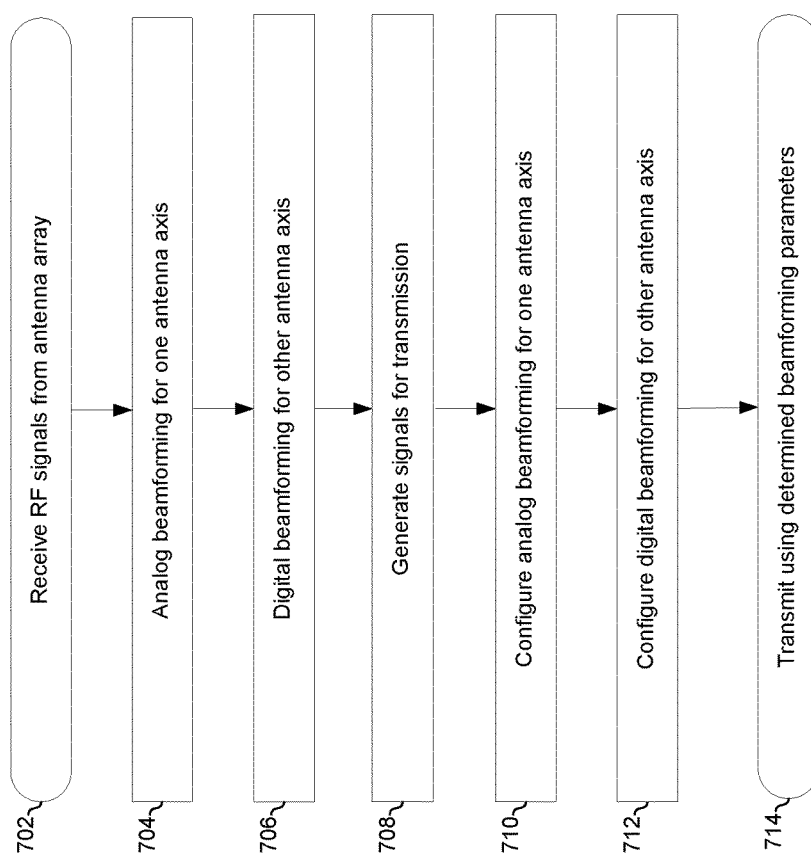
FIG. 7 is a flowchart illustrating an example process for hybrid RF digital beamforming.

FIG. 7 is a flowchart illustrating an example process for hybrid RF digital beamforming. In block 702, RF signals may be received by an array of antennas with a first axis and a second axis. In block 704, analog beamforming may be configured for the first axis where less beam steering is needed. In block 706, digital beamforming may be configured for the second axis. In an example scenario, the signals may comprise I/O signals.

In block 708, signals may be generated for transmission. In block 710, analog beamforming may be configured for the first antenna axis and in block 712 digital beamforming may be configured for the second antenna axis. The signals may then be transmitted in block 714 using the determined/configured beamforming parameters.

In an embodiment of the disclosure, a method and system may comprise one or more circuits in an electronic device comprising an antenna array having antennas arranged along first and second directions. The one or more circuits are operable to beamform signals in an analog domain along the first direction of the antenna array and beamform signals in a digital domain along the second direction of the antenna array. The antenna array may comprise subsets of antennas, where each subset comprises a system-on-chip (SOC) with analog and digital beamforming circuitry. Each SOC may be coupled to other SOCs using a digital interface. Signals may be beamformed in the analog domain by amplifying signals received by the antenna array using a configurable gain and shifting the phase of at least one of the amplified signals. The phase-shifted signals may be summed and converted to a digital signal utilizing an analog-to-digital converter (ADC). A frequency-dependent coefficient may be applied to the digital signal. The antenna array may have a fewer number of antennas along the first direction as compared to a number of antennas along the second direction. A tracking module in the electronic device may subtract an amplified and filtered version of a signal received by a first antenna from an amplified and filtered version of a signal received by a second antenna arranged in the first direction from the first antenna.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:
1. An electronic device, the device comprising:
one or more circuits coupled to an antenna array comprising antennas arranged along first and second directions, said one or more circuits being operable to:
beamform signals in an analog domain along the first direction of the antenna array; and
beamform signals in a digital domain along the second direction of the antenna array, with wider beam steering in the second direction as compared to narrower beam steering in the first direction.
2. The electronic device according to claim 1, wherein the antenna array comprises subsets of antennas, each subset comprising a system-on-chip (SOC) with analog and digital beamforming circuitry.
3. The electronic device according to claim 2, wherein each SOC is coupled to other SOCs using a digital interface.
4. The electronic device according to claim 1, wherein the one or more circuits are operable to beamform signals in the analog domain by amplifying signals received by the antenna array using a configurable gain and shifting the phase of at least one of the amplified signals.

5. The electronic device according to claim 4, wherein the one or more circuits is operable to sum the phase-shifted signals.

6. The electronic device according to claim 5, wherein the one or more circuits is operable to convert the summed signal to a digital signal utilizing an analog-to-digital converter (ADC).

7. The electronic device according to claim 6, wherein the one or more circuits is operable to apply a frequency-dependent coefficient to the digital signal.

8. The electronic device according to claim 1, wherein the antenna array has a fewer number of antennas along the first direction as compared to a number of antennas along the second direction.

9. The electronic device according to claim 1, wherein the one or more circuits comprise a tracking module that subtracts an amplified and filtered version of a signal received by a first antenna from an amplified and filtered version of a signal received by a second antenna arranged in the first direction from the first antenna.

10. The electronic device according to claim 1, wherein the one or more circuits is operable to process in-phase and quadrature (I and Q) signals.

11. A method for communication, the method comprising:
in an electronic device comprising an antenna array comprising antennas arranged along first and second directions:
beamforming signals in an analog domain along the first direction of the antenna array; and
beamforming signals in a digital domain along the second direction of the antenna array, with wider beam steering in the second direction as compared to narrower beam steering in the first direction.

12. The method according to claim 11, wherein the antenna array comprises subsets of antennas, each subset comprising a system-on-chip (SOC) with analog and digital beamforming circuitry.

13. The method according to claim 12, wherein each SOC is coupled to other SOCs using a digital interface.

14. The method according to claim 11, comprising beamforming signals in the analog domain by amplifying signals received by the antenna array using a configurable gain and shifting the phase of at least one of the amplified signals.

15. The method according to claim 14, comprising summing the phase-shifted signals.

16. The method according to claim 15, comprising converting the summed signal to a digital signal utilizing an analog-to-digital converter (ADC).

17. The method according to claim 16, comprising applying a frequency-dependent coefficient to the digital signal.

18. The method according to claim 11, wherein the antenna array has a fewer number of antennas along the first direction as compared to a number of antennas along the second direction.

19. The method according to claim 11, comprising, in a tracking module in the electronic device, subtracting an amplified and filtered version of a signal received by a first antenna from an amplified and filtered version of a signal received by a second antenna arranged in the first direction from the first antenna.

20. An electronic device comprising:
one or more circuits coupled to an antenna array comprising antennas arranged along first and second directions, with more antennas being arranged along the first direction as compared to those arranged along the second direction, said one or more circuits being operable to:
beamform signals in an analog domain along the first direction of the antenna array; and
beamform signals in a digital domain along the second direction of the antenna array, with wider beam steering in the second direction as compared to narrower beam steering in the first direction.

* * * * *